United States Patent
Mittapalli et al.

(10) Patent No.: US 7,899,090 B2
(45) Date of Patent: Mar. 1, 2011

(54) REMOTE INSTALLATION PERFORMANCE OVER MANAGEMENT CONTROLLERS IN MONOLITHIC AND MODULAR SYSTEMS

(75) Inventors: Balaji Mittapalli, Austin, TX (US); Thomas Chenault, Round Rock, TX (US); RadhaKrishna Reddy Dasari, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 528 days.

(21) Appl. No.: 11/615,090

(22) Filed: Dec. 22, 2006

(65) Prior Publication Data
US 2008/0155533 A1    Jun. 26, 2008

(51) Int. Cl.
H04L 12/28    (2006.01)
(52) U.S. Cl. ............... 370/546; 370/254; 370/255
(58) Field of Classification Search .............. 370/546, 370/254, 255
See application file for complete search history.

(56) References Cited

U.S. PATENT DOCUMENTS

| | | | | |
|---|---|---|---|---|
| 5,421,009 A | | 5/1995 | Platt ........................... 395/600 |
| 5,809,251 A | | 9/1998 | May et al. ................ 395/200.53 |
| 5,859,969 A | | 1/1999 | Oki et al. .................... 395/200.3 |
| 5,860,012 A | | 1/1999 | Luu .............................. 395/712 |
| 5,974,547 A | * | 10/1999 | Klimenko ........................ 713/2 |
| 5,999,741 A | | 12/1999 | May et al. ...................... 395/712 |
| 6,324,690 B1 | | 11/2001 | Luu ................................. 717/11 |
| 6,330,715 B1 | * | 12/2001 | Razzaghe-Ashrafi ........ 717/171 |
| 6,684,397 B1 | | 1/2004 | Byer et al. ..................... 717/174 |
| 6,857,069 B1 | * | 2/2005 | Rissmeyer et al. .............. 713/2 |
| 6,944,858 B2 | | 9/2005 | Luu ............................... 717/174 |
| 7,131,031 B2 | | 10/2006 | Brundridge et al. ............ 714/25 |
| 7,350,068 B2 | * | 3/2008 | Anderson et al. .................. 713/2 |
| 7,415,519 B2 | * | 8/2008 | Abbondanzio et al. ........ 709/226 |
| 2003/0200428 A1 | | 10/2003 | Chan et al. |
| 2004/0103177 A1 | * | 5/2004 | Ben Ismail et al. ........... 709/222 |
| 2004/0236991 A1 | | 11/2004 | Brundridge et al. ............ 714/25 |
| 2005/0054289 A1 | | 3/2005 | Salazar et al. |
| 2005/0097181 A1 | | 5/2005 | Bishop et al. |
| 2005/0160287 A1 | | 7/2005 | Mehta et al. .................. 713/200 |
| 2006/0155838 A1 | | 7/2006 | Wu et al. |
| 2006/0242400 A1 | | 10/2006 | Anderson et al. |

OTHER PUBLICATIONS

Office Action for DE Patent Application No. 10 2007 061 249.6-53 dated Dec. 4, 2008.
INTEL Corporation, Preboot Execution Environment (PXE) Specification, v. 2.1, Sep. 20, 1999.

(Continued)

Primary Examiner — Dang T Ton
Assistant Examiner — Robert M Morlan
(74) Attorney, Agent, or Firm — Hamilton & Terrile, LLP; Gary W. Hamilton

(57) ABSTRACT

A method and system are provided for installing software code on a remote information handling system (RIHS) comprising a management access controller (MAC). A remote management station (RMS) is implemented to manage the RIHS by communicating with its MAC over a network connection. The RIHS is initially booted by selecting a virtual media device (VMD) emulating a predetermined physical mass storage device containing a boot file and appearing to be physically attached via the RIHS's USB bus. Once booted, the RMS transfers additional boot files and installation files containing network share information to the MAC. The MAC transfers the files across a USB bus to the RIHS's memory where they are loaded and installed. A network connection is established to a network share comprising software code installation files. The software code installation files are then transferred from the network share to the RIHS for installation.

12 Claims, 3 Drawing Sheets

OTHER PUBLICATIONS

Response to Office Action for GB Patent Application No. 0725082.2 dated Feb. 6, 2009.
Search Report for GB Patent Application No. GB0725082.2 dated Apr. 21, 2008.
Office Action for GB Patent Application No. GB0725082.2 (P/60228.GB01) dated May 28, 2009.
Office Action for GB Patent Application No. GB0902175.9 (P/60228.GB02) dated May 28, 2009.
Search and Examination Report for Singapore Patent Application No. 200719024-2, Nov. 22, 2008.
A. Diop et al., Remote Real Laboratory: Linux Installation and Configuration, International Conference Internet Computing IC '03, Las Vegas NV, vol. 1, pp. 232-236, Jun. 23-26, 2003.

* cited by examiner

REMOTE INSTALLATION PERFORMANCE OVER MANAGEMENT CONTROLLERS IN MONOLITHIC AND MODULAR SYSTEMS

BACKGROUND OF THE INVENTION

1. Field of the Invention

The present invention relates in general to the field of remote information handling system administration and more specifically, to the remote installation of software code.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The volume of data that information handling systems manage continues to grow, driving the need for scalable systems that not only sustain information integrity and availability, but also make efficient use of computing resources. One popular approach to addressing this need is the use of large, interconnected servers comprising multiple processors. Another popular approach is blade server systems, which generally comprise a number of individual computer blades housed within a chassis that provides a common power supply, cooling, and management resources. Each computer blade typically includes one or more processors, computer memory, network connections, and computer storage. An advantage to this approach is that users, applications and/or processes can be assigned to specific computer blades and/or spread across available resources. As additional processing power or capacity is needed, additional computer blades are added to the blade server.

Regardless of the chosen approach, administering servers from a remote location is often mandatory in today's business environment. Management access controllers (MACs) like the Dell Remote Access Controller (DRAC) provide the ability to install and manage software on remote servers. One aspect of these MACs is they allow the remote installation of operating system (OS) and other software through a feature known as virtual media. Virtual media allows administrators to remotely connect a mass storage device to a server and use the device as if it were physically present on the server. Virtual media generally uses hardware to emulate universal serial bus (USB) mass storage devices with native USB interfaces, thereby avoiding the need for additional device drivers. After the virtual media device is connected through the managed server's USB bus, the server's OS treats it as if the administrator had physically attached a USB hard disk, floppy disk, or compact disk to the remote server. Once a virtual media device is connected to the server, administrators can remotely boot the device through a remote management console application. Once the remote management console is launched and the managed server powered-up and booted, the system management experience is the same as if the administrator were physically present at the remote server.

Virtual media can be similarly used to emulate the managed server's MAC as a local, USB-connected storage device. During software installations, the managed server will attempt to read data from the MAC just as if it were a local storage device. In actuality, a read request generated by the managed server is typically routed through a host USB bus port to a USB bus port on the MAC where it is received by the MAC's USB hardware. The management application running in the MAC formats the request into Ethernet packets, which are forwarded through the MAC to management firmware residing in the LAN On Motherboard (LOM) module. The LOM then forwards the packets to the remote management client over an external network connection. Responses are received over the network connection from the remote management client and the process is repeated in reverse until the remote server receives the response. As another example, since the MAC is emulated as a local USB device, the OS is required to load modules for USB devices. Because of this, software installations (e.g., OS installation) take more time with virtual media implementations than with existing installation methods such as pre-boot execution environment (PXE) and network file system (NFS) that are implemented over a network connection. In part, this is due to multiple MACs in a blade system sharing a single network connection. Simultaneous remote installations can create excessive amounts of network traffic, leading to congestion on the shared network connection. While providing an effective remote administration solution, this approach adds undesirable latency and increases installation time due to the multiple hardware and software steps involved. As a result, longer installation times can be experienced as well as possible connection timeouts, which can become more pronounced over time as processing loads increase.

SUMMARY OF THE INVENTION

A method and system are disclosed for installing software code on a remote information handling system (RIHS) comprising a management access controller (MAC). In selected embodiments, a remote management station (RMS) is implemented to manage the RIHS by communicating with its MAC over a network connection. The RIHS is initially booted by selecting a virtual media device (VMD) that emulates a predetermined physical media device attached to the RMS. In one embodiment, the physical media device is a universal serial bus (USB) mass storage device (e.g., floppy drive, CR-ROM drive, hard drive, etc.), which contains a boot file and appears to the RIHS to be physically attached via the RIHS's USB bus.

Once booted, the RMS transfers additional boot files and installation files containing network share information over an out-of-band network connection to a network port on the MAC. The MAC receives the files and transfers them across the RIHS's USB bus, where they are loaded into the RIHS's memory and installed.

Once the RIHS is fully booted and the network share installation files are installed, the RIHS uses the network share information to establish a network connection to a network share comprising software code installation files. After the network connection is established, the software code installation files are transferred from the network share to the RIHS for installation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and system are provided for installing software code on a remote information handling system (RIHS) comprising a management access controller (MAC). In selected embodiments, a remote management station (RMS) is implemented to manage the RIHS by communicating with its MAC over a network connection. The RIHS is initially booted by selecting a virtual media device (VMD) that emulates a predetermined physical mass storage device (e.g., floppy drive, CR-ROM drive, hard drive, etc.), which contains a boot file and appears to be physically attached via the RIHS's USB bus. Once booted, the RMS transfers additional boot files and installation files containing network share information to the MAC, which transfers them across the RIHS's USB bus to the RIHS's memory where they are loaded and installed. Once the RIHS is fully booted and the network share installation files are installed, a network connection is established to a network share comprising software code installation files. The software code installation files are transferred from the network share to the RIHS for installation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
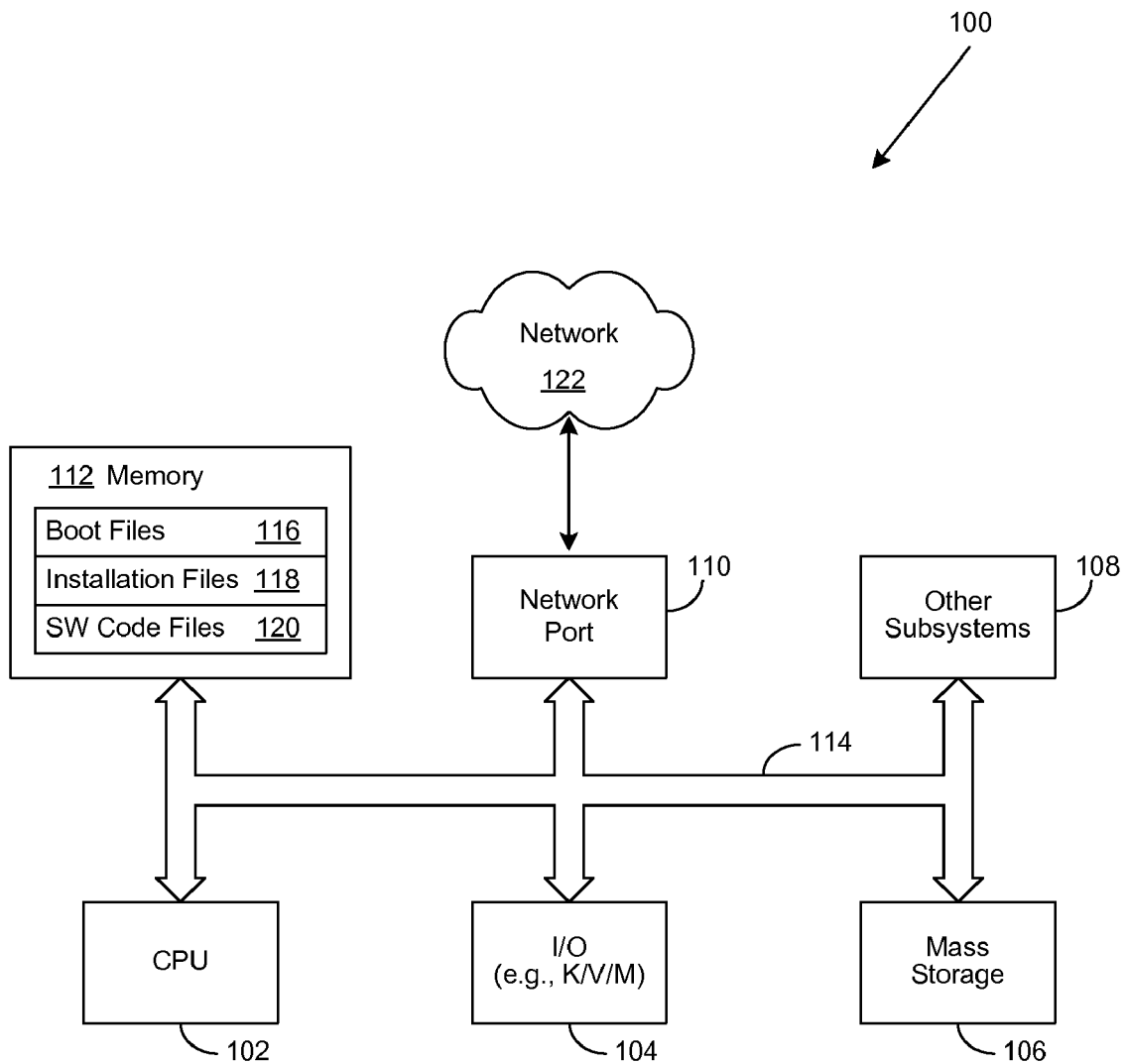
FIG. 1 is a generalized illustration of an information handling system 100 that can be used to implement the system and method of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110 operable to connect to a network 122, and system memory 112, all interconnected via one or more buses 114. System memory 112 further comprises boot files 116, network share installation files 118, and software code installation files 120.

Figure 2:
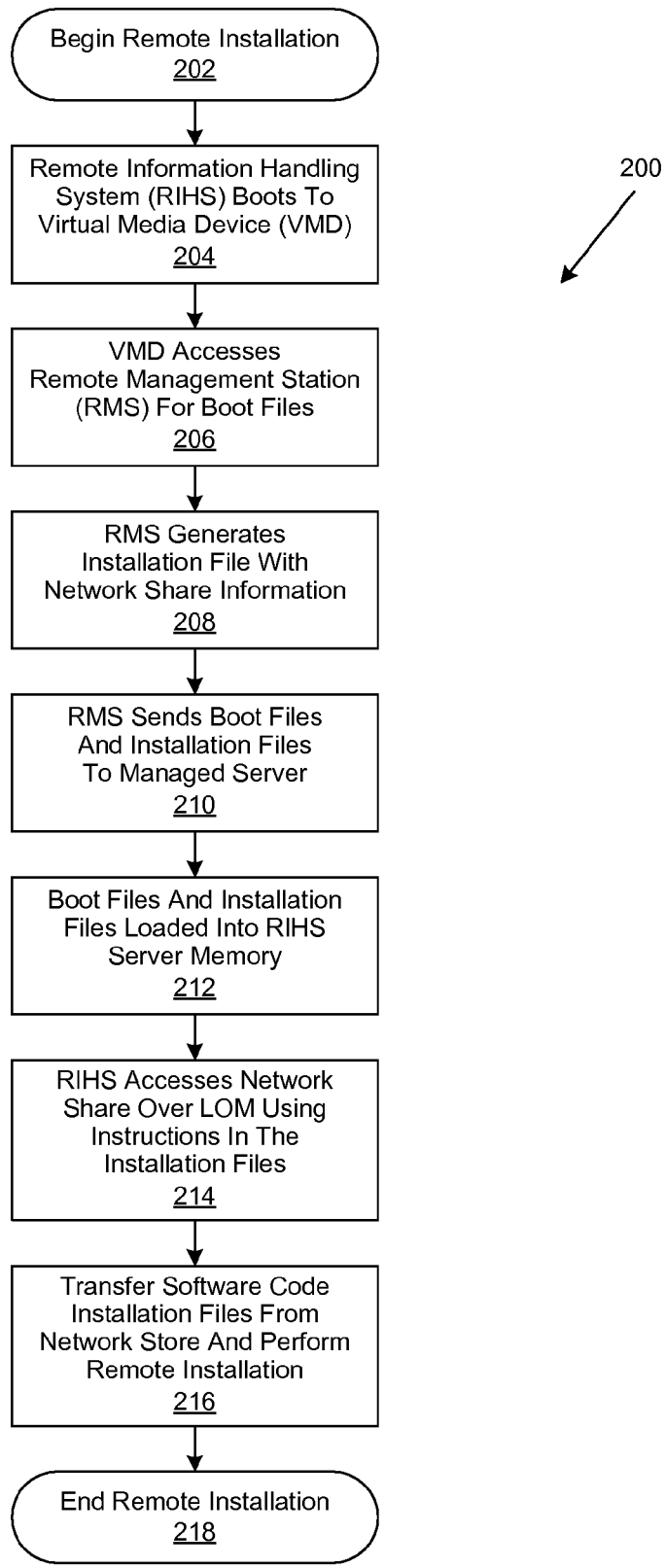
FIG. 2 is a generalized flowchart of the installation of software code on a remote information handling system (RIHS) in accordance with an embodiment of the invention.

FIG. 2 is a generalized flowchart of the installation of software code 200 on a remote information handling system (RIHS) in accordance with an embodiment of the invention. In selected embodiments, remote installation of software code on an RIHS comprising a management access controller (MAC) begins in step 202. In step 202, the RIHS boots to a virtual media device (VMD), which generally uses hardware to emulate universal serial bus (USB) mass storage devices with native USB interfaces, thereby avoiding the need for additional device drivers. In one embodiment (not shown), a virtual media server runs in the RIHS's MAC and a virtual media client runs in a remote management station (RMS). Administrators can log onto the virtual media server through an out-of-band network connection and establish a virtual media session. Once established, the virtual media session forwards requests from the RIHS to the management client running on the remote management station through a network connection. After the virtual media device is connected through the RIHS's USB bus, the RIHS's OS treats it as if the administrator had physically attached a USB hard disk, floppy disk, or compact disk to the RIHS. Once a virtual media device is connected to the server, administrators can remotely boot the device through a management application implemented in the remote management station. Once the management application is launched and the RIHS powered-up and booted, the system management experience is the same as if the administrator were physically present at the RIHS.

Once the RIHS has completed its initial boot sequence, the VMD accesses the RMS for additional boot files in step 206, followed by the RMS generating one or more installation files comprising network share information. Once the network share installation files are generated, the RMS uses a network connection to send the additional boot files and the generated network share installation files in step 210 to the MAC implemented in the RIHS. In one embodiment, the network connection is over a local area network (LAN) using a communications protocol such as Ethernet to connect to a network port implemented in the MAC. In another embodiment, the network connection is over a wide area network (WAN) using a telecommunications protocol such as TCP/IP or frame relay to connect to a network port implemented in the MAC. In yet another embodiment, the network connection implements a plurality of communication technologies and protocols to connect to a network port implemented in the MAC.

After the MAC receives the additional boot files and the network share installation files, they are routed in step 212 through a USB port implemented in the MAC to a host USB port on the RIHS, where they are loaded into the RIHS's memory. Once loaded, boot procedures proceed using the additional boot files and after the server is booted, the installation files comprising the network share information are likewise loaded and executed. After the network share installation files have been installed, the RIHS uses the network share information to establish a network connection to the network share location in step 214. Once the network connection is established, software code installation files are transferred from the network share to the RIHS for installation in step 216. In one embodiment, the network connection between the network share and the RIHS is through a LAN on motherboard (LOM) port implemented in the RIHS. Once all software code installation files have been received and installed, remote installation ends in step 218.

Figure 3:
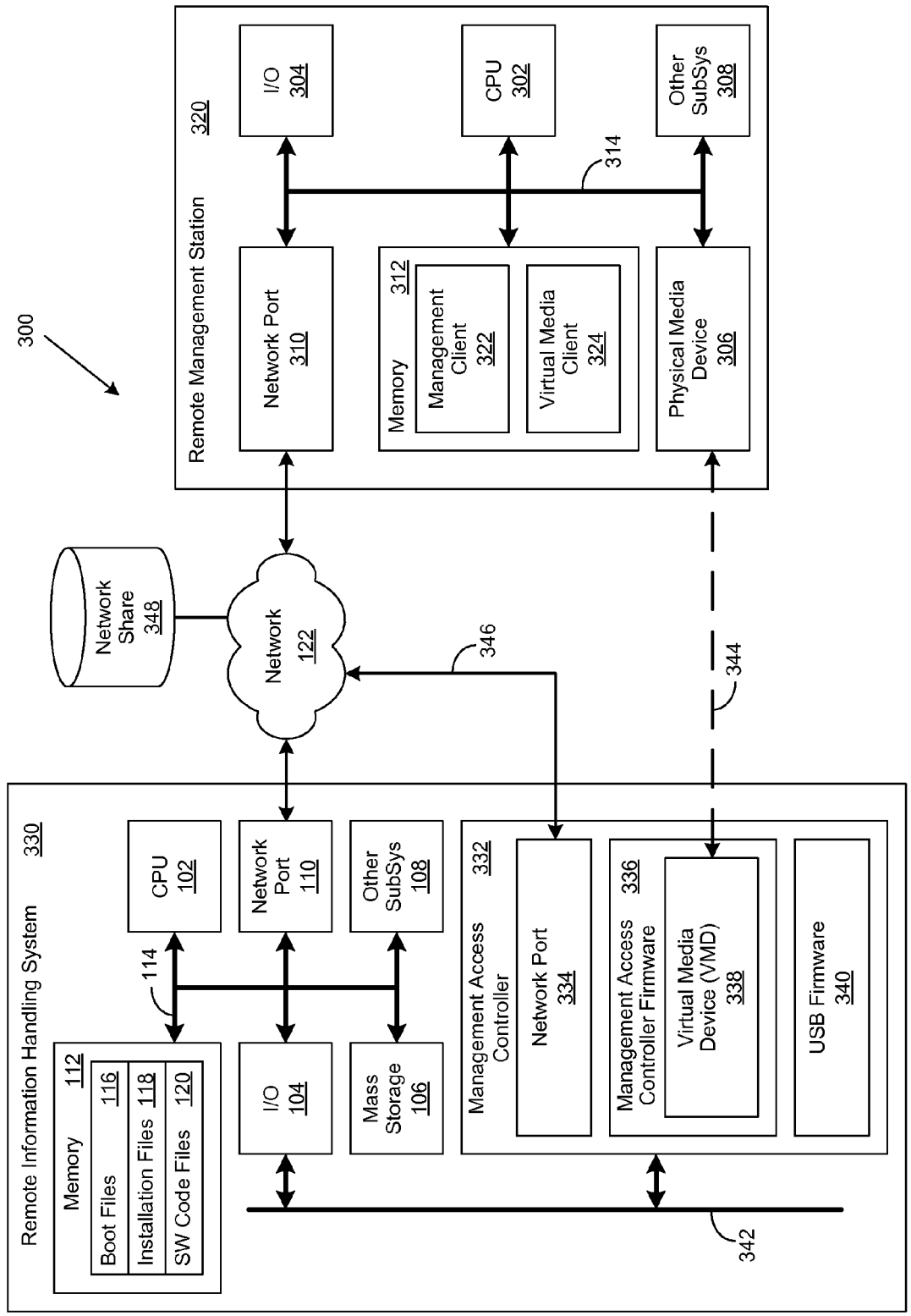
FIG. 3 is a generalized block diagram of an RIHS implemented in accordance with an embodiment of the invention for the remote installation of software code.

FIG. 3 is a generalized block diagram of a remote information handling system (RIHS) implemented in accordance with an embodiment of the invention for the remote installation 300 of software code. In selected embodiments, RIHS 330 comprises a processor (e.g., central processor unit or "CPU") 102, input/output (I/O) devices 104, such as a display, a keyboard, a mouse, and associated controllers, a hard drive or disk storage 106, various other subsystems 108, network port 110 operable to connect to a network 122, and system memory 112, all interconnected via one or more buses 114. System memory 112 further comprises boot files 116, network share installation files 118, and software code installation files 120. RIHS 330 also comprises management access controller (MAC) 332 connected via universal serial bus (USB) 342 to I/O port 104. MAC 332 further comprises network port 334, USB firmware 340, and MAC firmware 336, which further comprises virtual media device (VMD) 338.

Remote management station (RMS) 320 comprises a processor (e.g., central processor unit or "CPU") 302, input/output (I/O) devices 304, such as a display, a keyboard, a mouse, and associated controllers, a physical media device 306 such as a floppy disk drive, a CD-ROM drive or a hard disk drive, various other subsystems 308, network port 310 operable to connect to a network 122, and system memory 312, all interconnected via one or more buses 314. System memory 312 further comprises management client 322 and virtual media client 324. RIHS 330, RMS 320 and network share 348 are all connected via network 122.

In selected embodiments, remote installation of software code on RIHS 330 begins with the RIHS booting to VMD 338, which generally uses hardware to emulate 334 physical media device 306. In one embodiment, VMD 338 emulates physical media device 306 as a USB mass storage device with a native USB interface, thereby avoiding the need for additional device drivers. In one embodiment, the physical media device comprises a boot file, which further comprises a boot kernel. In another embodiment (not shown), a virtual media server runs in the MAC 332 and a virtual media client runs in RMS 320. Administrators can log onto the virtual media server through an out-of-band (OOB) network connection 346 and establish a virtual media session. Once established, the virtual media session forwards requests from the RIHS 330 to the management client running on the RMS 320 through OOB network connection 346. After the virtual media device is connected through the RIHS's USB bus 342, the RIHS 330 treats it as if the administrator had physically attached physical media 306 (e.g., USB hard disk, floppy disk, or compact disk) to the RIHS 330. Once the virtual media device 338 is connected to the RIHS 330, administrators can remotely boot the device through the management application 322 implemented in the RMS 320. Once the management application 322 is launched and the RIHS 330 powered-up and booted, the system management experience is the same as if the administrator were physically present at the RIHS.

Once RIHS 330 has completed its initial boot sequence, the VMD 338 accesses the RMS 320 for additional boot files, followed by the RMS 320 generating one or more installation files comprising network share 348 information. Once the network share installation files are generated, the RMS uses a network connection to send the additional boot files and the generated network share installation files to the MAC 332 network port 334 over OOB network connection 346. In one embodiment, the OOB network connection 346 is over a local area network (LAN) using a communications protocol such as Ethernet to connect to a network port 334. In another embodiment, the OOB network connection 346 is over a wide area network (WAN) using a telecommunications protocol such as TCP/IP or frame relay to connect to a network port 334. In yet another embodiment, the OOB network connection 346 implements a plurality of communication technologies and protocols to connect to network port 334.

After the MAC 332 receives the additional boot files and the network share installation files, they are routed through a USB port implemented in the MAC 331 over USB bus 342 to a host USB port on the RIHS 330, where they are loaded into the RIHS's memory 112. Once loaded, boot procedures proceed using the additional boot files 116, and after the server is booted, the network share installation files 118 comprising the network share 348 information are likewise loaded and executed. After the network share installation files 118 have been installed, the RIHS 330 uses the network share 348 information to establish a network connection from network port 110, through network 348, to the network share 348. Once the network connection is established, software code installation files 120 are transferred from the network share 348 to the RIHS 330 for installation. In one embodiment, the network connection between the network share 348 and the RIHS 330 is through a network port 110 comprising a LAN on motherboard (LOM) port.

It will be apparent to those of skill in the art that the undesirable latency and increased software code installation times of current approaches are reduced as only boot files and network share installation files are routed over USB bus 342. Software code installation files, which typically comprise the majority of the files involved when installing software code, are instead routed from network share 348 through network 122 to network port 110. As a result, the slower bus speed of USB bus 342 and the intermediate processing steps described in greater detail herein are removed as constraints. Skilled practitioners in the art will likewise recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A method for installing software code on a remote information handling system (RIHS) comprising a management access controller (MAC), the method comprising:

using a virtual media device (VMD) to initiate said RIHS, wherein said VMD is operable to emulate a predetermined physical media device attached to a remote management station (RMS);

using a first network port and a second network port to establish an out of band network connection between said MAC and said RMS, wherein said MAC comprises said first network port, said RMS comprises said second network port, and said predetermined physical media device comprises at least one boot file;

using said at least one boot file to perform boot operations to remotely boot said RIHS, wherein said RMS performs said boot operations and said VMD is coupled to said RIHS through a universal serial bus;

generating at least one network share installation file comprising network share information, wherein said generating is performed by said RMS;

transferring said at least one network share installation file from said RMS to said MAC, wherein said network share installation file is transferred over said out of band network connection;

loading said at least one network share installation file from said MAC into said RIHS for installation; and using a third network port and said network share information contained in said network share installation file to establish a non-out-of-band network connection operable to transfer at least one software code installation file from a network share associated with said network share installation file to said RIHS.

2. The method of claim 1, wherein said VMD comprises a universal serial bus (USB) interface.

3. The method of claim 1, wherein said VMD is operable to be configured in a BIOS implemented in said RIHS.

4. The method of claim 1, wherein said at least one boot file comprises boot kernel information.

5. The method of claim 1, wherein said at least one network share installation file is copied from said MAC to said RIHS memory over a USB connection.

6. The method of claim 1, wherein said third network port comprises a local area network (LAN) on motherboard (LOM) port.

7. A system for installing software code on a remote information handling system (RIHS) comprising a management access controller (MAC), the system comprising:

a virtual media device (VMD) operable to initiate said RIHS, wherein said VMD is operable to emulate a predetermined physical media device attached to a remote management station (RMS);

a first network port and a second network port operable to establish an out of band network connection between said MAC and said RMS, wherein:

said MAC comprises said first network port and said RMS comprises said second network port;

said predetermined physical media device comprises at least one boot file;

said at least one boot file is used to perform boot operations to remotely boot said RIHS;

said RMS performs said boot operations; and said VMD is coupled to said RIHS through a universal serial bus;

at least one network share installation file comprising network share information, wherein said at least one network share installation file is generated by said RMS and is transferred over said out of band network connection; and a third network port operable to establish a non-out-of-band network connection operable-to transfer at least one software code installation file from a network share to said RIHS, wherein said network share information contained in said network share installation file is used by said third network port to establish said network connection.

8. The system of claim 7, wherein said VMD comprises a universal serial bus (USB) interface.

9. The system of claim 7, wherein said VMD is operable to be configured in a BIOS implemented in said RIHS.

10. The system of claim 7, wherein said at least one boot file comprises boot kernel information.

11. The system of claim 7, wherein said at least one network share installation file is copied from said MAC to said RIHS memory over a USB connection.

12. The system of claim 7, wherein said third network port comprises a local area network (LAN) on motherboard (LOM) port.

* * * * *